(12) United States Patent
Park et al.

(10) Patent No.: US 10,594,460 B2
(45) Date of Patent: Mar. 17, 2020

(54) APPARATUS AND METHOD FOR TRANSMITTING AND RECEIVING UPLINK CHANNEL

(71) Applicant: KT CORPORATION, Gyeonggi-do (KR)

(72) Inventors: Kyujin Park, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/048,210

(22) Filed: Jul. 27, 2018

(65) Prior Publication Data

US 2019/0036665 A1 Jan. 31, 2019

(30) Foreign Application Priority Data

Jul. 28, 2017 (KR) .................... 10-2017-0095980
Aug. 11, 2017 (KR) .................... 10-2017-0102577
May 18, 2018 (KR) .................... 10-2018-0057278

(51) Int. Cl.
*H04L 5/00* (2006.01)
*H04B 1/713* (2011.01)

(52) U.S. Cl.
CPC ........... *H04L 5/0051* (2013.01); *H04B 1/713* (2013.01); *H04L 5/0012* (2013.01); *H04L 5/0091* (2013.01)

(58) Field of Classification Search
CPC ... H04L 5/0037; H04L 5/0039; H04L 5/0041; H04L 5/0042; H04L 5/0048; H04L 5/0051; H04L 5/0053; H04L 5/0055; H04L 5/0057; H04L 5/0058; H04B 1/713; H04B 1/7136

See application file for complete search history.

(56) References Cited

U.S. PATENT DOCUMENTS

| | | | | |
|---|---|---|---|---|
| 8,897,249 B2* | 11/2014 | Tiirola | ................... | H04W 72/04 370/329 |
| 2012/0014330 A1* | 1/2012 | Damnjanovic | ......... | H04L 5/001 370/329 |
| 2012/0076028 A1* | 3/2012 | Ko | ........................ | H04L 1/0026 370/252 |
| 2012/0170525 A1* | 7/2012 | Sorrentino | ............ | H04L 5/0007 370/329 |

(Continued)

OTHER PUBLICATIONS

Samsung, "Bandwidth Part Hopping for CORESETS", R1-1710702, 3GPP TSG RAN WG1 NR ad-Hoc#2, Qingdao, China, Jun. 27-30, 2017, pp. 1-3.

*Primary Examiner* — Kevin D Mew
(74) *Attorney, Agent, or Firm* — IP Legal Services, LLC

(57) ABSTRACT

Provided are an apparatus and method for transmitting and receiving an uplink (UL) channel. A method for a user equipment (UE) to transmit a UL control channel and a UL data channel to a base station (BS) includes receiving bandwidth part (BWP) configuration information of a BWP set composed of one or more BWPs configured for a UE from a BS, receiving frequency hopping configuration information for a UL control channel and a UL data channel transmitted through one BWP of the BWP set from the BS, and transmitting a UL control channel and a UL data channel to the BS through the single BWP of the BWP set based on the BWP configuration information and the frequency hopping configuration information.

12 Claims, 10 Drawing Sheets

(56) References Cited

U.S. PATENT DOCUMENTS

| | | | | |
|---|---|---|---|---|
| 2012/0250653 A1* | 10/2012 | Zhang | H04B 1/7143 | 370/330 |
| 2013/0058317 A1* | 3/2013 | Park | H04L 5/0053 | 370/336 |
| 2013/0077523 A1* | 3/2013 | Ko | H04W 24/00 | 370/252 |
| 2013/0322361 A1* | 12/2013 | Ko | H04B 7/0632 | 370/329 |
| 2013/0322376 A1* | 12/2013 | Marinier | H04W 72/06 | 370/329 |
| 2014/0036859 A1* | 2/2014 | Ekpenyong | H04W 72/042 | 370/330 |
| 2014/0044083 A1* | 2/2014 | Kim | H04L 5/001 | 370/329 |
| 2014/0092787 A1* | 4/2014 | Han | H04W 4/70 | 370/280 |
| 2014/0169316 A1* | 6/2014 | Kim | H04L 5/0048 | 370/329 |
| 2014/0219202 A1* | 8/2014 | Kim | H04L 1/1861 | 370/329 |
| 2014/0376468 A1* | 12/2014 | He | H04B 1/713 | 370/329 |
| 2015/0155928 A1* | 6/2015 | Seo | H04L 5/0053 | 370/329 |
| 2015/0180621 A1* | 6/2015 | Guan | H04B 1/713 | 370/330 |
| 2015/0195069 A1* | 7/2015 | Yi | H04W 4/70 | 370/329 |
| 2015/0229450 A1* | 8/2015 | Noh | H04W 72/0406 | 370/329 |
| 2017/0163391 A1* | 6/2017 | Kimura | H04W 16/14 | |
| 2017/0164350 A1* | 6/2017 | Sun | H04L 5/0007 | |
| 2017/0223640 A1* | 8/2017 | Dinan | H04W 72/0473 | |
| 2017/0366311 A1* | 12/2017 | Iyer | H04B 7/0482 | |
| 2018/0007668 A1* | 1/2018 | Yum | H04L 1/0067 | |
| 2018/0014143 A1* | 1/2018 | Rico Alvarino | H04W 4/70 | |

* cited by examiner

APPARATUS AND METHOD FOR TRANSMITTING AND RECEIVING UPLINK CHANNEL

CROSS REFERENCE TO RELATED APPLICATION

This application claims priority from Korean Patent Application Nos. 10-2017-0095980, 10-2017-0102577, and 10-2018-0057278, filed on Jul. 28, 2017, Aug. 11, 2017, and May 18, 2018, which are hereby incorporated by reference for all purposes as if fully set forth herein.

BACKGROUND OF THE INVENTION

1. Field of the Invention

The present disclosure relates to an apparatus and method for transmitting and receiving an uplink (UL) channel, and more particularly, to an apparatus and method for performing frequency hopping for UL channel transmission and reception in a next generation/fifth generation (5G) (will be referred to as New Radio (NR) below) radio access network.

2. Description of the Related Art

Recently, the Third Generation Partnership Project (3GPP) approved "Study on New Radio Access Technology" which is a study item for research on next generation/5G radio access technology, and Radio Access Network (RAN) Working Group 1 (WG1) is separately discussing frame structures, channel coding and modulation, waveforms, multiple-access schemes, etc. for NR on the basis of the technology. It is required to design an NR to meet not only an improved data transmission rate compared to Long Term Evolution (LTE)/LTE-Advanced but also various demands of subdivided and detailed usage scenarios.

Representative usage scenarios of NR may include enhanced Mobile BroadBand (eMBB), massive Machine Type Communication (mMTC), and Ultra Reliable and Low Latency Communications (URLLC). It is also required to design a frame structure to be flexible in comparison to LTE/LTE-Advanced (LTE-A) as a method for meeting requirements of respective usage scenarios.

In particular, when an NR user equipment (UE) uses various bandwidth parts (BWPs), there is an increasing necessity of setting a detailed and efficient method for the UE to transmit UL channels, that is, a UL control channel and a UL data channel, to a base station (BS) on the basis of the BWPs.

SUMMARY OF THE INVENTION

In this background, the present disclosure is to provide a frequency hopping application method for preventing collision between resources used by user equipments (UEs) which use different bandwidth part (BWP) configurations to transmit uplink (UL) channels in New Radio (NR).

Objects of the present disclosure are not limited thereto, and other objects which have not been mentioned will be apparent to those of ordinary skill in the art from the following descriptions.

To solve the foregoing problem, in accordance with an embodiment, a method may be provided for a UE to transmit a UL control channel and a UL data channel to a base station (BS). The method may include: receiving, from a BS, BWP configuration information of a BWP set composed of one or more BWPs configured for a UE; receiving, from the BS, frequency hopping configuration information for a UL control channel and a UL data channel transmitted through one BWP of the BWP set; and transmitting a UL control channel or a UL data channel to the BS through the single BWP on the basis of the BWP configuration information and the frequency hopping configuration information.

In accordance with another embodiment, a method may be provided for a BS to receive a UL control channel and a UL data channel from a UE. The method may include: transmitting BWP configuration information of a BWP set composed of one or more BWPs configured for a UE to the UE; transmitting frequency hopping configuration information for a UL control channel and a UL data channel transmitted through one BWP of the BWP set to the UE; and receiving the UL control channel or the UL data channel from the UE through the single BWP on the basis of the BWP configuration information and the frequency hopping configuration information.

In accordance with further another embodiment, a UE may be provided for transmitting a UL control channel and a UL data channel to a BS. The UE may include: a receiver configured to receive BWP configuration information of a BWP set composed of one or more BWPs configured for the UE from a BS and receive frequency hopping configuration information for a UL control channel and a UL data channel transmitted through one BWP of the BWP set from the BS; and a transmitter configured to transmit a UL control channel or a UL data channel to the BS through the single BWP on the basis of the BWP configuration information and the frequency hopping configuration information.

In accordance with still another embodiment, a BS may be provided for receiving a UL control channel and a UL data channel from a UE. The BS may include: a transmitter configured to transmit BWP configuration information of a BWP set composed of one or more BWPs configured for a UE and transmit frequency hopping configuration information for a UL control channel and a UL data channel transmitted through one BWP of the BWP set; and a receiver configured to receive a UL control channel or a UL data channel from the UE through the single BWP on the basis of the BWP configuration information and the frequency hopping configuration information.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
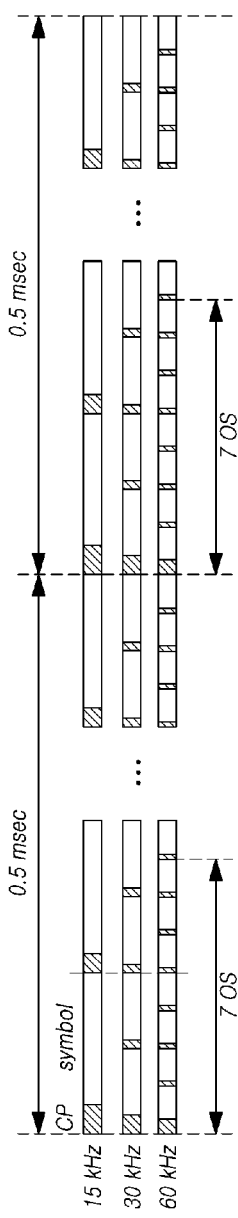
FIG. 1 is a diagram for showing an arrangement of orthogonal frequency-division multiplexing (OFDM) symbols according to an embodiment of the present disclosure when different subcarrier spacing (SCS) values are used.

Hereinafter, embodiments of the present disclosure will be described in detail with reference to the accompanying drawings. In adding reference numerals to elements in each drawing, the same elements will be designated by the same reference numerals if possible, although they may be shown in different drawings. Further, in the following description of the present disclosure, a detailed description of known functions and configurations incorporated herein will be omitted when it is determined that the description may make the subject matter of the present disclosure rather unclear.

In this specification, a wireless communication system denotes a system for providing various communication services, such as voice, packet data, and the like. A wireless communication system includes a user equipment (UE) and a base station (BS).

A UE is a comprehensive concept that refers to a terminal in wireless communication and should be construed as encompassing not only a UE in a wideband code division multiple access (WCDMA) network, a Long Term Evolution (LTE) network, a high speed packet data access (HSPA) network, a network of International Mobile Telecommunications for 2020 (IMT-2020; fifth generation (5G) or New Radio (NR)), etc., but also a mobile station (MS), a user terminal (UT), a subscriber station (SS), a wireless device, etc. in Global System for Mobile communication (GSM).

A BS or cell refers to a station which generally communicates with a UE and encompasses a node-B, an evolved node-B (eNB), a gateway station Node-B (gNB), a low power node (LPN), a sector, a site, various types of antennas, a base transceiver system (BTS), an access point, a point (e.g., a transmission point, a reception point, and a transmission/reception point), a relay node, and various coverage regions, such as a mega-cell, a macro-cell, a micro-cell, a picocell, a femtocell, a remote radio head (RRH), a radio unit (RU), a small cell, and the like.

Since there is a BS for controlling each of the various cells listed above, a BS may be interpreted into two meanings: 1) a device for providing a mega-cell, a macro-cell, a micro-cell, a picocell, a femtocell, or a small cell in relation to a radio region or 2) the radio region itself. According to the first meaning, the BSs may be i) devices which provide certain radio regions under control of the same entity or ii) all devices which interact with each other to cooperatively provide a radio region. A point, a transmission/reception point, a transmission point, a reception point, etc. are embodiments of a BS according to a method of providing a radio region. According to the second meaning, a BS may be a radio region itself in or from which a signal is received or transmitted from the viewpoint of a UE or a neighboring BS.

In this specification, a cell may refer to the coverage of a signal transmitted from a transmission/reception point, a component carrier having the coverage of a signal transmitted from a transmission point or a transmission/reception point, or a transmission/reception point itself.

In this specification, a UE and a BS are used as comprehensive meanings of two (uplink and downlink) transmitting and receiving entities used to implement the technology or technical spirit described in the present disclosure, but not limited to terms or words that are specifically referred to.

Here, an uplink (UL) refers to a method of transmitting and receiving data to and from a BS by a UE, and a downlink (DL) refers to a method of transmitting and receiving data to and from a UE by a BS.

For UL transmission and DL transmission, it is possible to use one of i) time division duplex (TDD) in which transmission is performed by using different times, ii) frequency division duplex (FDD) in which transmission is performed by using different frequencies, and iii) a mixed scheme of TDD and FDD.

Also, in a wireless communication system, a UL and a DL are configured on the basis of one carrier wave or one pair of carrier waves according to a standard.

In a UL and a DL, control information is transmitted through a control channel, such as a physical downlink control channel (PDCCH), a physical uplink control channel (PUCCH), etc. The UL and the DL are configured as data channels, such as a physical downlink shared channel (PDSCH), a physical uplink shared channel (PUSCH), etc., such that data is transmitted.

A DL may refer to communication or a communication path from a multi-transmission/reception point to a UE, and a UL may refer to communication or a communication path from the UE to the multi-transmission/reception point. In the DL, a transmitter may be a part of the multi-transmission/reception point, and a receiver may be a part of the UE. Also, in the UL, a transmitter may be a part of the UE, and a receiver may be a part of the multi-transmission/reception point.

"A signal is transmitted and received through a channel, such as a PUCCH, a PUSCH, a PDCCH, or a PDSCH," may have the same meaning of "a PUCCH, a PUSCH, a PDCCH, or a PDSCH is transmitted and received."

Meanwhile, high layer signaling mentioned below includes radio resource control (RRC) signaling for transmitting RRC information including an RRC parameter.

A BS performs DL transmission to UEs. A BS may transmit a PDCCH for transmitting DL control information, such as scheduling required to receive a DL data channel, which is a main physical channel for unicast transmission, and scheduling grant information for transmission in an UL data channel. Transmission and reception of a signal through each channel will be referred to as "transmission and reception of a channel."

Any multiple access scheme may be applied to a wireless communication system. It is possible to use various multiple access schemes including time-division multiple access (TDMA), frequency-division multiple access (FDMA), CDMA, orthogonal frequency-division multiple access (OFDMA), non-orthogonal multiple access (NOMA), OFDM-TDMA, OFDM-FDMA, and OFDM-CDMA. Here, NOMA includes sparse code multiple access (SCMA), low density spreading (LDS), and the like.

An embodiment of the present disclosure may be applied to resource allocation in asynchronous wireless communication, which evolves into LTE/LTE-Advanced (LTE-A) and IMT-2020 through GSM, WCDMA, and HSPA, synchronous wireless communication which evolves into CDMA, CDMA-2000, and Ultra Mobile Broadband (UMB), and the like.

In this specification, a machine-type communication (MTC) UE may refer to a UE which supports low cost (or low complexity), a UE which supports coverage enhancement, or the like. Alternatively, in this specification, an MTC UE may refer to a UE which is defined as a specific category to support low cost (or low complexity) and/or coverage enhancement.

In other words, in this specification, an MTC UE may refer to a Third Generation Partnership Project (3GPP) Release-13 low cost (or low complexity) UE category/type which was newly defined and performs an LTE-based MTC-related operation. Alternatively, in this specification, an MTC UE may support an enhanced coverage which is more extensive than the existing LTE coverage or may refer to a UE category/type defined in 3GPP Release-12 or a lower version which supports low power consumption or a Release-13 low cost (or low complexity) UE category/type which was newly defined. Otherwise, an MTC UE may refer to a further enhanced MTC UE defined in Release-14.

In this specification, a narrowband Internet of things (NB-IoT) UE refers to a UE supporting radio access for cellular IoT. Objects of the NB-IoT technology include enhanced indoor coverage, support for large-scale low-speed UEs, low latency sensitivity, very low cost of UEs, low power consumption, and optimized network architecture.

Representative usage scenarios in NR which is recently under discussion in the 3GPP may include enhanced Mobile BroadBand (eMBB), massive Machine Type Communication (mMTC), and Ultra Reliable and Low Latency Communications (URLLC).

In this specification, frequencies, frames, subframes, resources, resource blocks, regions, bands, sub-bands, control channels, data channels, synchronization signals, various reference signals, various signals, and various messages related to NR may be interpreted as meanings used in the past or present or various meanings which will be used in the future.

New Radio (NR)

Recently, the 3GPP approved "Study on New Radio Access Technology" which is a study item for research on next generation/5G radio access technology, and separate discussions have begun on frame structures, channel coding and modulation, waveforms, multiple-access schemes, etc. for NR on the basis of the technology.

It is required to design an NR to meet not only an improved data transmission rate compared to LTE/LTE-A but also various demands of subdivided and detailed usage scenarios. In particular, eMBB, mMTC, and URLLC are proposed as representative usage scenarios of NR. It is also required to design a frame structure to be flexible in comparison to LTE/LTE-A as a method for meeting requirements of respective usage scenarios.

Specifically, eMBB, mMTC, and URLLC are considered as representative urge scenarios in NR which is recently under discussion in the 3GPP. The respective usage scenarios have different requirements of data rates, latency, coverage, etc. Accordingly, it is necessary to develop a method of efficiently multiplexing radio resource units on the basis of different numerologies (e.g., subcarrier spacing (SCS) values, subframes, transmission time intervals (TTIs), etc.) for efficiently meeting usage scenario-specific requirements through a frequency band constituting an arbitrary NR system.

As a method for the purpose, discussions were made on a method of supporting numerologies having different SCS values by multiplexing the numerologies on the basis of time-division multiplexing (TDM), frequency-division multiplexing (FDM), or TDM/FDM through one NR carrier and a method of supporting one or more time units to set a scheduling unit in a time domain. In relation to this, a subframe was defined as a time domain structure in NR, and it was determined to define a single subframe duration composed of 14 OFDM symbols of a 15 kHz SCS-based normal cyclic prefix (CP) overhead, which is the same as that of LTE, as a reference numerology for defining a corresponding subframe duration. Accordingly, a subframe has a time duration of 1 ms in NR. However, unlike LTE, a subframe in NR is an absolute reference time duration, and a slot and a mini-slot may be defined as time units which are bases of actual UL/DL data scheduling. In this case, y which is the number of OFDM symbols constituting a corresponding slot was determined to have a value of 14 regardless of numerology.

Accordingly, any slot may be composed of 14 symbols. According to a transmission direction of the corresponding slot, all the symbols may be used for DL transmission or UL transmission, or used in the form of "DL portion+gap+UL portion."

Also, a mini-slot composed of a smaller number of symbols than that of the corresponding slot may be defined in an arbitrary numerology (or SCS), and on the basis of the mini-slot, a short time-domain scheduling interval for UL/DL data transmission and reception may be set, or a long time-domain scheduling interval for UL/DL data transmission and reception may be set through slot aggregation.

In particular, in the case of transmission and reception of latency-critical data such as URLLC, when scheduling is made in units of slots based on 0.5 ms (7 symbols) or 1 ms (14 symbols) defined in a frame structure based on a numerology having a small SCS value such as 15 kHz, it may be difficult to meet latency requirements. To solve this problem, a mini-slot composed of a smaller number of OFDM symbols than that of the corresponding slot may be defined so that latency-critical data, such as the URLLC, may be scheduled on the basis of the mini-slot.

Alternatively, as described above, it is possible to consider a method of scheduling data according to latency requirements on the basis of slot (or mini-slot) lengths defined by numerology by supporting numerologies having different SCS values in one NR carrier through multiplexing based on TDM or FDM. For example, as shown in FIG. 1, a symbol length corresponding to an SCS value of 60 kHz is about ¼ of a symbol length corresponding to an SCS value of 15 kHz. Therefore, when one slot is composed of seven OFDM symbols, the 15 kHz-based slot length is 0.5 ms, and the 60 kHz-based slot length is reduced to about 0.125 ms.

In this way, in NR, discussions are underway on a method of meeting requirements of each of URLLC and eMBB by defining different SCS values or TTIs.

Wider Bandwidth Operations

A typical LTE system supports a scalable bandwidth operation for an arbitrary LTE component carrier (CC). In other words, any LTE service provider may set a minimum bandwidth of 1.4 MHz to a maximum bandwidth of 20 MHz according to a frequency deployment scenario when configuring one LTE CC. Accordingly, any normal LTE UE supports a transmission/reception capability of 20 MHz bandwidth for one LTE CC.

Figure 2:
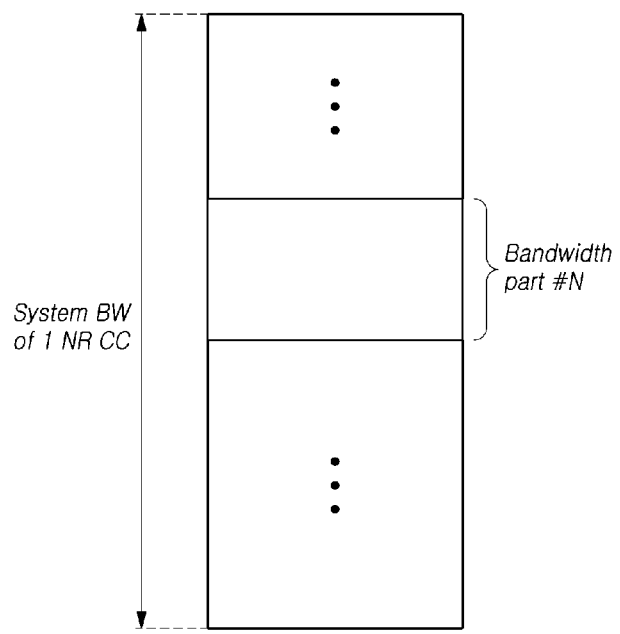
FIG. 2 is a diagram for showing a conceptual example of a bandwidth part (BWP) according to an embodiment of the present disclosure.

However, NR is designed to support NR UEs having different transmission/reception bandwidth capabilities by one NR CC. Accordingly, as shown in FIG. 2, it is required to configure one or more bandwidth parts (BWPs), which are composed of bandwidths obtained by subdividing an arbitrary NR CC, and support a wider and flexible bandwidth operation by setting and activating different BWPs according to UEs.

In this way, any NR CC may be divided into one or more BWPs. Accordingly, one or more BWPs may be configured for each UE, and UL/DL wireless signals and wireless channels for an arbitrary UE may be transmitted and received by activating at least one of one or more BWPs configured for the corresponding UE.

Also, when a plurality of numerologies (e.g., SCS values, CP lengths, etc.) are supported by any NR CC, different numerologies for transmission and reception may be set for respective BWPs.

Frequency Hopping for PUCCH in LTE

In the case of a PUCCH which is a UL wireless control channel for transmitting uplink control information (UCI) of a UE in a 3GPP LTE/LTE-A system, frequency hopping is performed in units of slots in one subframe. Here, a frequency hopping unit of the PUCCH is determined by a system bandwidth of a corresponding UL subframe, where the frequency hopping unit is a bandwidth over which a frequency is hopped.

Figure 3:
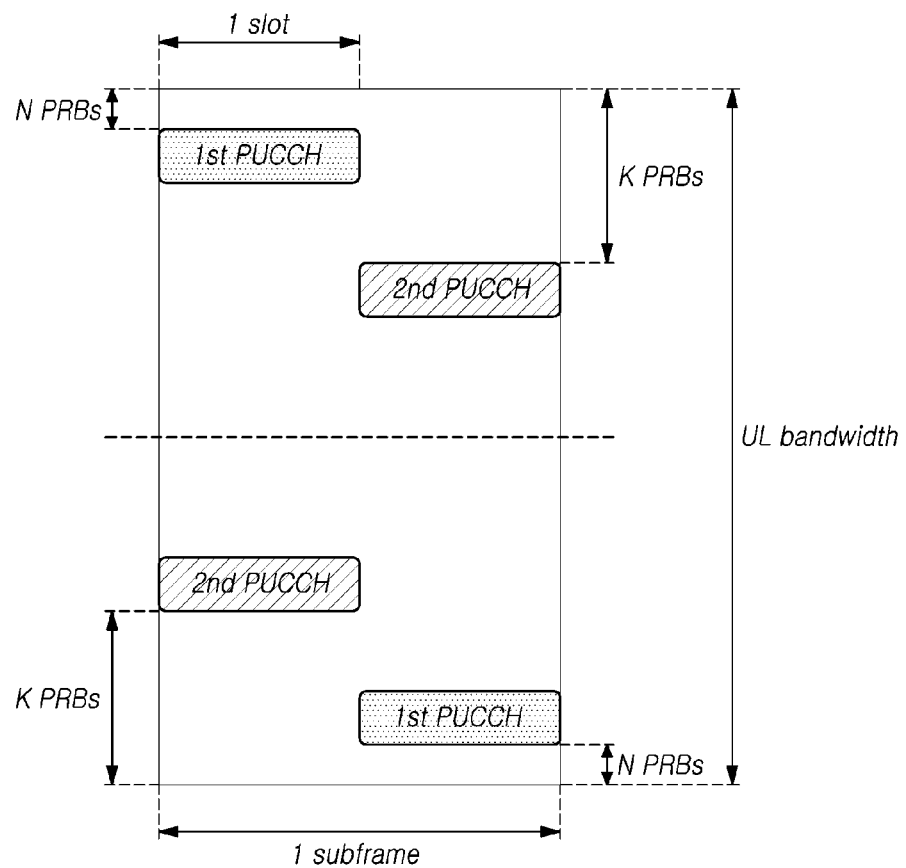
FIG. 3 is a diagram for showing an example of frequency hopping for a physical uplink control channel (PUCCH) defined in a Long Term Evolution (LTE)/Long Term Evolution-Advanced (LTE-A) system.

In other words, as shown in FIG. 3, frequency hopping in any UL subframe is defined to be performed in a symmetrical form with respect to a central frequency of each slot.

Embodiments described below may be applied to UEs, BSs, and core network entities (e.g., mobility management entities (MMEs)) which use any mobile communication technology. For example, the embodiments may be applied to a next generation mobile communication (e.g., 5G mobile communication, new-radio access technology (RAT)) UE, BS, core network entity (e.g., access and mobility function (AMF)) as well as a mobile communication UE to which LTE technology is applied. For convenience of description, a BS may represent an eNB of an LTE/evolved universal terrestrial radio access network (E-UTRAN), a BS (e.g., a central unit (CU), a distributed unit (DU), or a logical entity in which a CU and a DU are integrally implemented) in a 5G wireless network in which the CU and the DU are separated, or a gNB.

Also, a numerology described herein denotes numerical characteristics and meanings relating to data transmission and reception and may be determined by an SCS value. Therefore, a difference in numerology may denote that SCS values whereby numerologies are determined are different.

In this specification, a slot length may be represented by the number of OFDM symbols constituting a slot or a time occupied by the slot. For example, when one numerology based on 15 kHz SCS is used, the length of one slot may be represented by 14 OFDM symbols or 1 ms.

In this specification, a UL channel is a concept encompassing a PUSCH and a PUCCH that are transmitted to a BS by a UE, and transmission and reception of a UL channel between a BS and a UE may denote that the UE transmits the UL channel to the BS or the BS receives the UL channel from the UE.

Various embodiments of a method of performing frequency hopping for UL channel transmission and reception in a next generation/5G radio access network will be described in detail below. Embodiments described below may be applied individually or in combination.

As described above, an NR CC may be composed of one or more BWPs. When BWPs are configured in any NR CC, the BWPs may be configured to be UE-specific or cell-specific.

Figure 4:
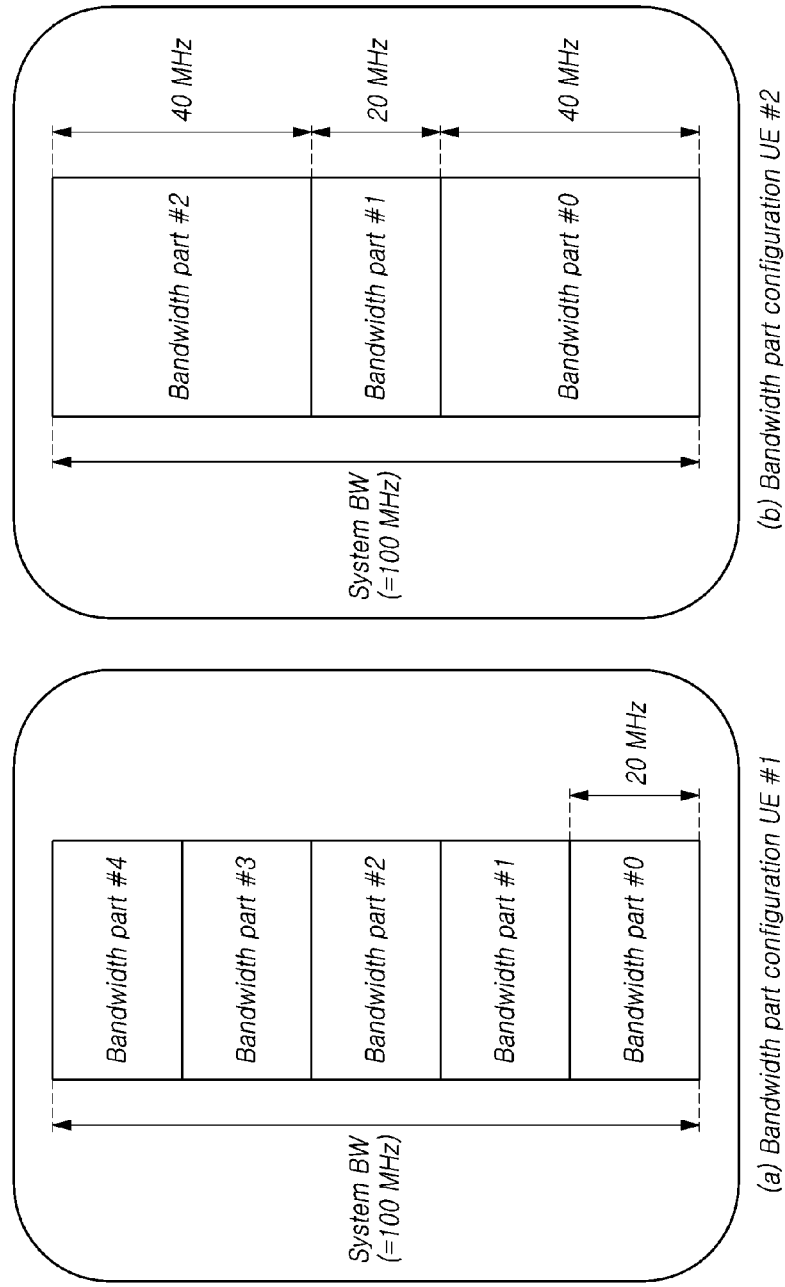
FIG. 4 is a diagram for showing a conceptual example of user equipment (UE)-specific bandwidth part BWP configurations according to an embodiment of the present disclosure.

In other words, a different BWP configuration may be set for each UE as shown in FIG. 4, or the same BWP configuration may be set in all UEs for any NR CC. However, FIG. 4 is a mere example, and the present disclosure is not limited to the detailed bandwidth and BWP-specific bandwidths of the NR CC.

When a BWP configuration is set for any NR CC, UL/DL BWPs for communication between a UE and a BS may be set by activating a DL BWP for transmitting and receiving a PDCCH/PDSCH between the BS and the UE and a UL BWP for transmitting and receiving a PUCCH/PUSCH among the configured BWPs.

In accordance with an embodiment of the present disclosure, a frequency hopping method may be provided for a case in which BWPs configured or activated for PUCCH transmission for each UE in a slot configured in any NR CC have different sizes.

Specifically, in NR, two types of PUCCHs are defined for a UE to transmit UCI. A first type is a short duration PUCCH which is transmitted through one or two symbols in one slot, and a second type is a long duration PUCCH which is transmitted through four to 14 symbols. The short duration PUCCH may also be referred to below as a short PUCCH, and the long duration PUCCH may also be referred to below as a long PUCCH.

When any UE uses a short duration PUCCH composed of two symbols or a long duration PUCCH in one slot to transmit UCI, it is necessary to apply frequency hopping to obtain frequency diversity gain.

In particular, in the case of a short duration PUCCH composed of two symbols, frequency hopping may be performed in units of symbols. Also, in the case of a long duration PUCCH, frequency hopping may be supported at most once in one slot.

According to NR, when frequency hopping is supported for a PUCCH in a single slot as described above, it is necessary to define a detailed frequency hopping method for a corresponding PUCCH so that any UE transmits UCI through a short duration PUCCH composed of two symbols or a long duration PUCCH.

Specifically, as NR supports UE bandwidth adaption, UEs having different transmission/reception bandwidths in an arbitrary NR CC are supported. Therefore, as described above, BWPs for PUCCH transmission and reception may be separately configured and activated for each UE. Accordingly, it is difficult to use the same single frequency hopping rule, which depends on a system bandwidth of a corresponding CC, unlike LTE.

In accordance with an embodiment of the present disclosure, a detailed frequency hopping method may be provided in consideration of this.

Embodiment 1: Implicit Method of Determining Hopping Bandwidth

According to a first embodiment of a detailed frequency hopping method, different frequency hopping rules may be defined for a long duration PUCCH and a short duration PUCCH. Alternatively, different frequency hopping rules may be defined according to the number of symbols assigned for PUCCH transmission in any slot or UE.

In other words, a frequency hopping bandwidth for a PUCCH, which will be applied to any UE, may be defined as a function of a PUCCH duration or the number of symbols assigned for PUCCH transmission, a bandwidth of a BWP configured and activated for PUCCH transmission or a system bandwidth of an NR CC, and the like.

For example, in the case of a long duration PUCCH, a frequency hopping bandwidth may be determined according to a system bandwidth of an NR CC with which an arbitrary UE is connected regardless of a bandwidth of a BWP activated for the UE. In the case of a short duration PUCCH, a frequency hopping bandwidth may be determined according to a bandwidth of a BWP which is UE-specifically activated for UL transmission and reception.

Similarly, when the number of symbols of a PUCCH assigned for an arbitrary UE in an arbitrary slot is a specific value or more, a frequency hopping bandwidth may be determined according to a system bandwidth of an NR CC. Otherwise, a frequency hopping bandwidth may be determined according to a bandwidth of an activated BWP.

As a detailed example, it is possible to define a frequency hopping rule based on a system bandwidth of an NR CC (i.e., type-1 frequency hopping) and a frequency hopping rule based on a bandwidth of a BWP which is activated for each UE (i.e., type-2 frequency hopping) (however, the present disclosure is not limited to the names such as type-1 frequency hopping and type-2 frequency hopping), and a frequency hopping rule which will be used for an arbitrary UE to transmit UCI may be determined according to a duration of a PUCCH to be used for transmitting the UCI.

Figure 5:
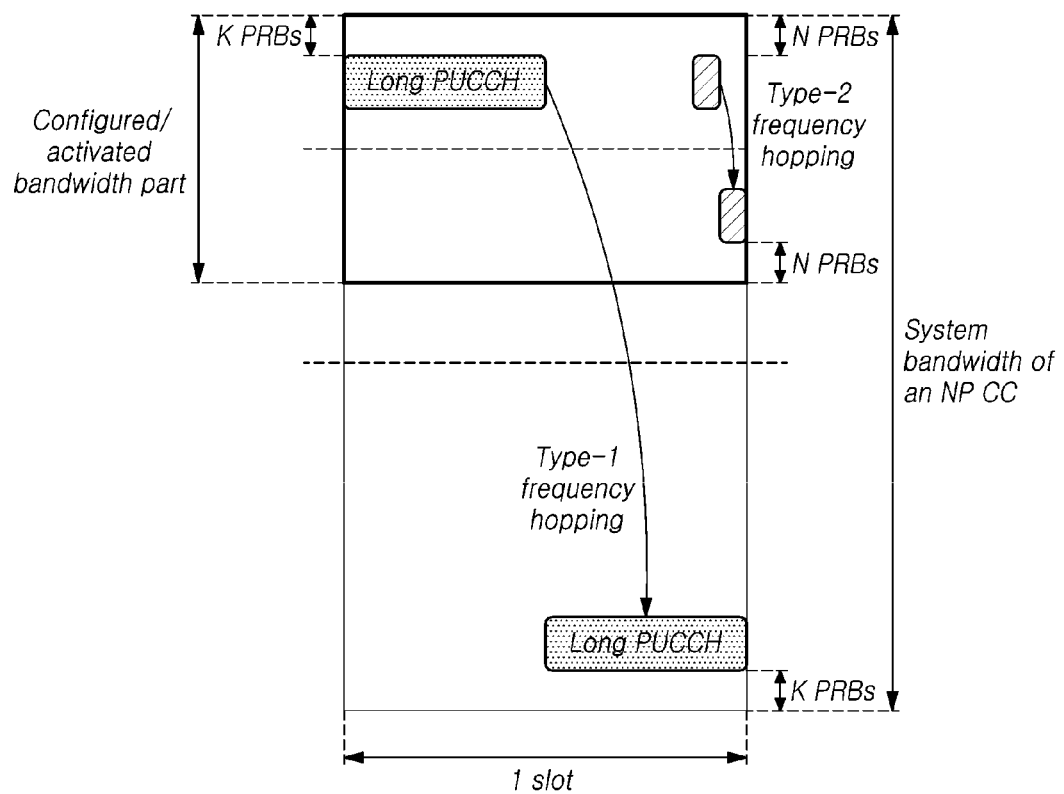
FIG. 5 is a diagram for showing an example of a frequency hopping rule based on PUCCH duration according to an embodiment of the present disclosure.

In other words, as shown in FIG. 5, type-1 frequency hopping may be applied to a long duration PUCCH, and type-2 frequency hopping may be applied to a short duration PUCCH, or a frequency hopping type may be determined according to the number of symbols assigned for PUCCH transmission.

However, when the frequency hopping rule based on a system bandwidth (i.e., type-1 frequency hopping) is applied and a corresponding hopping bandwidth is greater than a transmission/reception bandwidth of a UE, a returning gap may be defined between frequency hops of a PUCCH. Alternatively, a BS/network may set and indicate a frequency hopping type for PUCCH transmission for each UE through UE-specific/cell-specific higher layer signaling, media access control (MAC) control element (CE) signaling, or level-1 (L1) control signaling.

Embodiment 2: Explicit Method of Determining Hopping Bandwidth

A BS/network may set/indicate a frequency hopping bandwidth for a PUCCH for each UE. As a detailed method, a BS/network may directly set and signal a frequency hopping bandwidth for a PUCCH for each UE through UE-specific/cell-specific higher layer signaling.

Additionally, before frequency hopping configuration for a corresponding PUCCH, it is possible to define a default frequency hopping bandwidth or a default frequency hopping rule which will be applied to any UE. The default frequency hopping bandwidth or the default frequency hopping rule may be determined according to a bandwidth of a BWP or a bandwidth of an NR CC in the same way as described in Embodiment 1 with reference to FIG. 5.

However, when a PUCCH hopping bandwidth is set through UE-specific/cell-specific higher layer signaling, the same hopping bandwidth may be set regardless of PUCCH duration, UCI type (e.g., scheduling request (SR), channel state indicator (CSI) feedback, or hybrid automatic request (HARQ) acknowledgement (ACK)/negative acknowledgement (NACK) feedback), payload size, or the like.

Alternatively, as described in Embodiment 1, a frequency hopping bandwidth may be set differently according to a PUCCH duration, the number of symbols assigned for PUCCH transmission in an arbitrary slot, or a PUCCH format dependent on a UCI type, a payload size, or the like.

For another method for a BS/network to set/indicate a frequency hopping bandwidth for a PUCCH for each UE, a BS/network may indicate frequency hopping bandwidths, which will be applied to respective PUCCH transmission operations, through L1 control signaling. Specifically, when an arbitrary UE indicates PUCCH transmission for HARQ ACK/NACK feedback or CSI feedback through downlink control information (DCI), such as DL assignment DCI or UL grant, for the UE, frequency hopping bandwidth indication information may be directly transmitted through the corresponding DCI together with PUCCH transmission resource allocation information.

However, as a method for reducing control overhead, it is possible to define candidate values which may be indicated by the BS/network through the PUCCH frequency hopping bandwidth indication information of the DCI, and indicate one of the candidate values through the DCI.

Here, the candidate values for PUCCH frequency hopping may be defined according to a bandwidth of a BWP or a system bandwidth of an NR CC, or may be set by the BS/network through cell-specific/UE-specific higher layer signaling.

Alternatively, a default frequency hopping bandwidth or a default frequency hopping rule may be defined, and the BS/network may dynamically indicate an offset value (e.g., a physical resource block (PRB) offset value) from a frequency location of a second hop of a corresponding PUCCH (i.e., a PRB of the second hop of the corresponding PUCCH), to which the default frequency hopping bandwidth or the default frequency hopping rule has been applied, through L1 control signaling of corresponding DL assignment DCI or UL grant.

Alternatively, the BS/network may set a corresponding offset value through UE-specific/group common/cell-specific higher layer signaling or MAC CE signaling.

Figure 6:
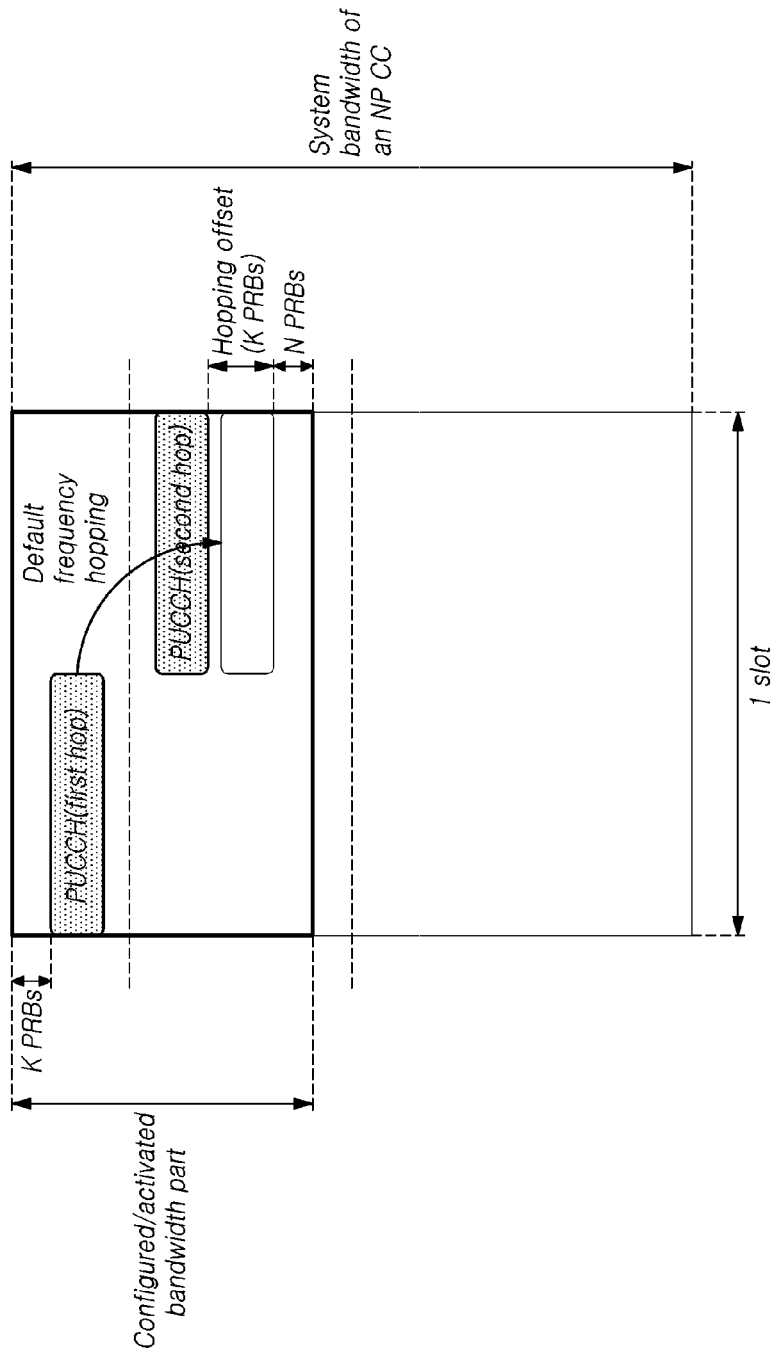
FIG. 6 is a diagram for showing an example of a method of indicating a frequency hopping offset through downlink control information (DCI) according to an embodiment of the present disclosure.

For example, as shown in FIG. 6, type-2 frequency hopping dependent on a bandwidth of a BWP configured and activated for each UE, which is one of the methods described in Embodiment 1, may be defined as a default frequency hopping rule for any UE to transmit a PUCCH, and the BS/network may indicate a frequency hopping offset value from a second frequency hop of the corresponding PUCCH conforming to the default frequency hopping rule through L1 control signaling.

However, this embodiment may be applied regardless of a detailed default frequency hopping rule. For example, a default frequency hopping bandwidth may be semi-statically set for each UE through cell-specific/UE-specific higher layer signaling, type-2 frequency hopping of Embodiment 1 described above may be defined as a default hopping rule, or different default hopping rules may be defined according to a PUCCH duration or the number of PUCCH symbols as described in Embodiment 1.

Also, candidate values for corresponding hopping offset values which may be indicated by DCI to reduce control overhead may be defined in the same way as the above-described method of indicating a frequency hopping bandwidth through L1 control signaling.

Embodiment 3: Method of Separately Allocating Frequency Resources (e.g., PRBs) for Each Frequency Hop When frequency hopping for a PUCCH is applied in a slot or between slots, a BS/network may configure separate frequency resource allocation information (e.g., PRB allocation information) for each frequency hop and directly set/indicate the frequency resource allocation information for a UE.

For example, as shown in FIG. 5 or 6, when an arbitrary UE sets/indicates PUCCH transmission through one UL slot and frequency hopping is applied to the PUCCH transmission, frequency resource allocation information (e.g. PRB allocation information) for a first frequency hop of a corresponding PUCCH and frequency resource allocation information (e.g. PRB allocation information) for a second frequency hop of the corresponding PUCCH may be separately set and signaled to the corresponding UE.

In other words, a method for a BS/network to signal frequency resource allocation information (e.g., PRB allocation information) for PUCCH transmission of a UE may be defined to separately set frequency resource allocation information (e.g. PRB allocation information) for a first frequency hop of the corresponding PUCCH transmission and frequency resource allocation information (e.g. PRB allocation information) for a second frequency hop of the corresponding PUCCH transmission and to transmit the same to the corresponding UE through UE-specific/group common/cell-specific higher layer signaling, MAC CE signaling, or L1 control signaling.

Additionally, a BS/network may enable or disable frequency hopping for a PUCCH through cell-specific/UE-specific higher layer signaling, MAC CE signaling, or L1 control signaling.

Also, the scope of the present disclosure encompasses a frequency hopping method for a PUCCH defined to be a combination of the above-described frequency hopping methods. The frequency hopping methods described in the present disclosure may be applied not only to a PUCCH but also to all UL physical channels/signals, such as a PUSCH, a sounding reference signal (SRS), a physical random access channel (PRACH), etc., without departing from the scope of the present disclosure.

Figure 7:
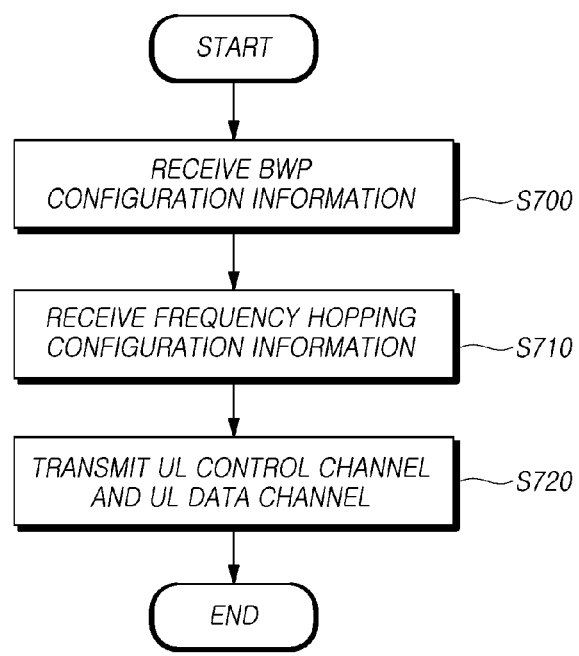
FIG. 7 is a flowchart illustrating a procedure of a UE for transmitting an uplink (UL) control channel and a UL data channel to a base station (BS) according to an embodiment of the present disclosure.

FIG. 7 is a flowchart illustrating a method of a UE for transmitting a UL control channel and a UL data channel to a BS according to an embodiment of the present disclosure.

Referring to FIG. 7, a UE may receive BWP configuration information from a BS (S700). The BWP configuration information is information on a BWP set composed of one or more BWPs configured for the UE.

For example, the BWP configuration information may include index information which indicates each BWP included in the BWP set composed of the one or more BWPs configured for the UE.

The UE may receive DL control information which indicates one of the BWPs included in the BWP set on the basis of the BWP configuration information from the BS.

Here, the number of bits of information indicating a BWP in the DL control information may be determined according to a maximum number N (N is a natural number greater than or equal to 1) of BWPs which may be used by the UE. For example, when N is set to four, four different pieces of information may be represented by at most two bits. Therefore, in the DL control information, information indicating a BWP may be one bit or two bits.

For another example, the BWP configuration information may additionally include SCS information and a CP for each BWP of the BWP set.

Here, each BWP of the BWP set may be configured on the basis of common resource block (RB) indexing information of a CC configured by the BS. The CC may be a narrowband (NB) CC or a wideband (WB) CC, or may refer to one or more CCs for carrier aggregation (CA).

All UEs which use the same CC may share the same common RB indexing information. In other words, it is possible to apply the same RB indexing regardless of whether an arbitrary CC is based on a single numerology or multiple numerologies are multiplexed on the CC.

Specifically, configuration information of each BWP of the BWP set may include a starting RB index, that is, a starting point of the BWP, based on the common RB indexing information. Such a starting PRB index may be represented in units of RB indices based on common RB indexing. Also, the configuration information of each BWP may additionally include starting RB indexing information based on the common RB indexing information and size information of the corresponding BWP. The BS may transmit the BWP configuration information to the UE through higher layer signaling (e.g., RRC signaling).

The UE may receive frequency hopping configuration information for a UL control channel and a UL data channel transmitted through one transmission BWP of the BWP set from the BS (S710).

Here, the frequency hopping configuration information for a UL control channel may include at least one of information indicating whether to perform frequency hopping, PRB allocation information of a first frequency resource region of the UL control channel, and PRB allocation information of a second frequency resource region of the UL control channel.

The first frequency resource region and the second frequency resource region which will be described below denote frequency resource regions to which a first PUCCH and a second PUCCH constituting the UL control channel are separately assigned when frequency hopping is performed. The first and second frequency resource regions may also be referred to as a first frequency hop and a second frequency hop, respectively.

The information indicating whether to perform frequency hopping is information which indicates whether to enable or disable frequency hopping for the UL control channel. When the frequency hopping is enabled, the frequency hopping is performed, and when the frequency hopping is disabled, no frequency hopping is performed.

When the frequency hopping is performed, the PRB allocation information of the first frequency resource region of the UL control channel may include starting PRB indexing information of the first frequency resource region.

Likewise, when the frequency hopping is performed, the PRB allocation information of the second frequency resource region of the UL control channel may include starting PRB indexing information of the second frequency resource region.

Also, the frequency hopping configuration information for a UL data channel may include a frequency hopping offset set which is composed of one or more frequency hopping offset values. Here, the frequency hopping offset values may be indicated as the numbers of PRBs.

The number of frequency hopping offset values included in the frequency hopping offset set may be determined on the basis of the number of PRBs constituting the transmission BWP.

As an example of a method of determining the number of frequency hopping offset values included in the frequency hopping offset set, the number of frequency hopping offset values included in the frequency hopping offset set may be determined depending on whether a number K of PRBs constituting the transmission BWP is a preset threshold value T (T is a natural number greater than or equal to 1) or less.

For example, when K is T (e.g., 50 PRBs) or less, the number of frequency hopping offsets may be set to a preset first hopping offset number (e.g., two), and when K exceeds T, the number of frequency hopping offsets may be set to a preset second hopping offset number (e.g., four). Here, the greater the size of the BWP, the greater the frequency hopping offset may be. Therefore, the second hopping offset number may be set to be greater than the first hopping offset number.

The UE may receive information indicating which one of the frequency hopping offset values included in the frequency hopping offset set will be used from the BS. Here, the BS may notify the UE of the corresponding information through UL grant DCI.

The UE may transmit a UL control channel and a UL data channel to the BS through the transmission BWP on the basis of the BWP configuration information and the frequency hopping configuration information (S720).

The BWP configuration information and the frequency hopping configuration information may be indicated by the BS through higher layer signaling (e.g., RRC signaling).

Figure 8:
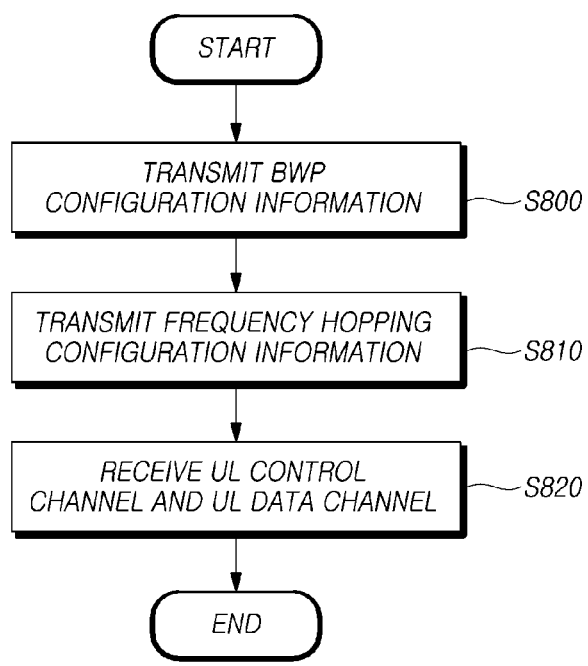
FIG. 8 is a flowchart illustrating a procedure of a BS for receiving a UL control channel and a UL data channel from a UE according to an embodiment of the present disclosure.

FIG. 8 is a flowchart illustrating a method of a BS for receiving a UL control channel and a UL data channel from a UE according to an embodiment of the present disclosure.

Referring to FIG. 8, a BS may transmit BWP configuration information of a BWP set which is composed of one or more BWPs configured for a UE to the UE (S800). The BWP configuration information is information on the BWP set composed of the one or more BWPs configured for the UE.

For example, the BWP configuration information may include index information which indicates each BWP included in the BWP set composed of the one or more BWPs configured for the UE.

The BS may transmit DL control information which indicates one of the BWPs included in the BWP set on the basis of the BWP configuration information to the UE.

Here, the number of bits of information indicating a BWP in the DL control information may be determined according to a maximum number N (N is a natural number greater than or equal to 1) of BWPs which may be used by the UE. For example, when N is set to four, four different pieces of information may be represented by at most two bits. Therefore, in the DL control information, information indicating a BWP may be one bit or two bits.

For another example, the BWP configuration information may additionally include SCS information and a CP for each BWP of the BWP set.

Here, each BWP of the BWP set may be configured on the basis of common RB indexing information of a CC configured by the BS. The CC may be an NB CC or a WB CC, or may refer to one or more CCs for CA.

All UEs which use the same CC may share the same common RB indexing information. In other words, it is possible to apply the same RB indexing regardless of whether an arbitrary CC is based on a single numerology or multiple numerologies are multiplexed on the CC.

Specifically, configuration information of each BWP of the BWP set may include a starting RB index, that is, a starting point of the BWP, based on the common RB indexing information. Such a starting PRB index may be represented in units of RB indices based on common RB indexing. Also, the configuration information of each BWP may additionally include starting RB index information based on the common RB indexing information and size information of the corresponding BWP. The BS may transmit the BWP configuration information to the UE through higher layer signaling (e.g., RRC signaling).

The BS may transmit frequency hopping configuration information for a UL control channel and a UL data channel received through one reception BWP of the BWP set to the UE (S810).

Here, the frequency hopping configuration information for a UL control channel may include at least one of information indicating whether to perform frequency hopping, PRB allocation information of a first frequency resource region of the UL control channel, and PRB allocation information of a second frequency resource region of the UL control channel.

The information indicating whether to perform frequency hopping is information which indicates whether to enable or disable frequency hopping for the UL control channel. When the frequency hopping is enabled, the frequency hopping is performed, and when the frequency hopping is disabled, no frequency hopping is performed.

When the frequency hopping is performed, the PRB allocation information of the first frequency resource region of the UL control channel may include starting PRB indexing information of the first frequency resource region.

Likewise, when the frequency hopping is performed, the PRB allocation information of the second frequency resource region of the UL control channel may include starting PRB indexing information of the second frequency resource region.

Also, the frequency hopping configuration information for a UL data channel may include a frequency hopping offset set which is composed of one or more frequency hopping offset values. Here, the frequency hopping offset values may be indicated as the numbers of PRBs.

The number of frequency hopping offset values included in the frequency hopping offset set may be determined on the basis of the number of PRBs constituting the reception BWP.

As an example of a method of determining the number of frequency hopping offset values included in the frequency hopping offset set, the number of frequency hopping offset values included in the frequency hopping offset set may be determined depending on whether a number K of PRBs constituting the reception BWP is a preset threshold value T (T is a natural number greater than or equal to 1) or less.

For example, when K is T (e.g., 50 PRBs) or less, the number of frequency hopping offsets may be set to a preset first hopping offset number (e.g., two), and when K exceeds T, the number of frequency hopping offsets may be set to a preset second hopping offset number (e.g., four). Here, the greater the size of the BWP, the greater the frequency hopping offset may be. Therefore, the second hopping offset number may be set to be greater than the first hopping offset number.

The UE may receive information indicating which one of the frequency hopping offset values included in the frequency hopping offset set will be used from the BS. Here, the BS may notify the UE of the corresponding information through UL grant DCI.

Also, the BS may receive a UL control channel and a UL data channel from the UE through the reception BWP on the basis of the BWP configuration information and the frequency hopping configuration information (S820).

The UE may be notified of the BWP configuration information and the frequency hopping configuration information through higher layer signaling (e.g., RRC signaling).

Figure 9:
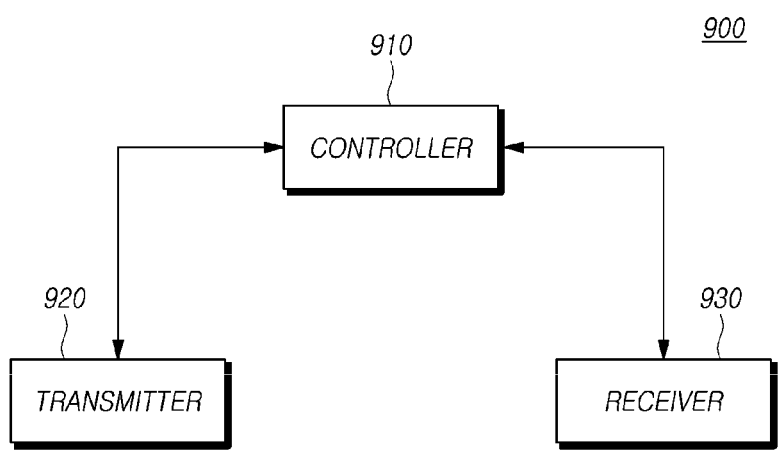
FIG. 9 is a diagram for showing a BS according to an embodiment of the present disclosure.

FIG. 9 is a diagram showing a BS according to an embodiment of the present disclosure.

Referring to FIG. 9, a BS 900 includes a controller 910, a transmitter 920, and a receiver 930.

The transmitter 920 and the receiver 930 are used to transmit and receive signals, messages, and data required to implement the above-described present disclosure.

Specifically, the transmitter 920 may transmit BWP configuration information of a BWP set composed of one or more BWPs configured for a UE and transmit frequency hopping configuration information for a UL control channel and a UL data channel received through one reception BWP included in the BWP set.

Here, the BWP configuration information is information on the BWP set composed of the one or more BWPs configured for the UE.

For example, the BWP configuration information may include index information which indicates each BWP included in the BWP set composed of the one or more BWPs configured for the UE.

The BS may transmit DL control information which indicates one of the BWPs included in the BWP set on the basis of the BWP configuration information to the UE.

Here, the number of bits of information indicating a BWP in the DL control information may be determined according to a maximum number N (N is a natural number greater than or equal to 1) of BWPs which may be used by the UE. For example, when N is set to four, four different pieces of information may be represented by at most two bits. Therefore, in the DL control information, information indicating a BWP may be one bit or two bits.

For another example, the BWP configuration information may additionally include SCS information and a CP for each BWP of the BWP set.

Here, each BWP of the BWP set may be configured on the basis of common RB indexing information of a CC configured by the BS. The CC may be an NB CC or a WB CC, or may refer to one or more CCs for CA.

All UEs which use the same CC may share the same common RB indexing information. In other words, it is possible to apply the same RB indexing regardless of whether an arbitrary CC is based on a single numerology or multiple numerologies are multiplexed on the CC.

Specifically, configuration information of each BWP of the BWP set may include a starting RB index, that is, a starting point of the BWP, based on the common RB indexing information. Such a starting PRB index may be represented in units of RB indices based on common RB indexing. Also, the configuration information of each BWP may additionally include starting RB indexing information based on the common RB indexing information and size information of the corresponding BWP. The BS may transmit the BWP configuration information to the UE through higher layer signaling (e.g., RRC signaling).

Also, the frequency hopping configuration information for a UL control channel may include at least one of information indicating whether to perform frequency hopping, PRB allocation information of a first frequency resource region of the UL control channel, and PRB allocation information of a second frequency resource region of the UL control channel.

The information indicating whether to perform frequency hopping is information which indicates whether to enable or disable frequency hopping for the UL control channel. When the frequency hopping is enabled, the frequency hopping is performed, and when the frequency hopping is disabled, no frequency hopping is performed.

When the frequency hopping is performed, the PRB allocation information of the first frequency resource region of the UL control channel may include starting PRB indexing information of the first frequency resource region.

Likewise, when the frequency hopping is performed, the PRB allocation information of the second frequency resource region of the UL control channel may include starting PRB indexing information of the second frequency resource region.

Also, the frequency hopping configuration information for a UL data channel may include a frequency hopping offset set which is composed of one or more frequency hopping offset values. Here, the frequency hopping offset values may be indicated as the numbers of PRBs.

The number of frequency hopping offset values included in the frequency hopping offset set may be determined on the basis of the number of PRBs constituting the reception BWP.

As an example of a method of determining the number of frequency hopping offset values included in the frequency hopping offset set, the number of frequency hopping offset values included in the frequency hopping offset set may be determined depending on whether a number K of PRBs constituting the reception BWP is a preset threshold value T (T is a natural number greater than or equal to 1) or less.

For example, when K is T (e.g., 50 PRBs) or less, the number of frequency hopping offsets may be set to a preset first hopping offset number (e.g., two), and when K exceeds T, the number of frequency hopping offsets may be set to a preset second hopping offset number (e.g., four). Here, the greater the size of the BWP, the greater the frequency hopping offset may be. Therefore, the second hopping offset number may be set to be greater than the first hopping offset number.

The UE may receive information indicating which one of the frequency hopping offset values included in the frequency hopping offset set will be used from the BS. Here, the BS may notify the UE of the corresponding information through UL grant DCI.

The receiver 930 may receive a UL control channel and a UL data channel from the UE through the reception BWP on the basis of the BWP configuration information and the frequency hopping configuration information.

The UE may be notified of the BWP configuration information and the frequency hopping configuration information through higher layer signaling (e.g., RRC signaling).

Figure 10:
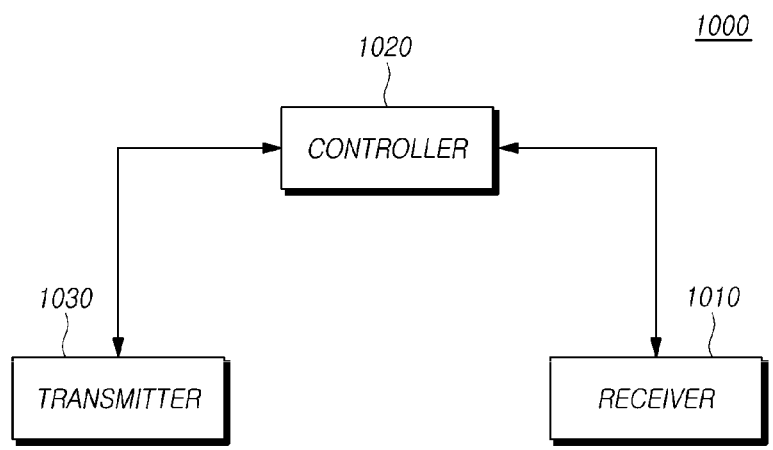
FIG. 10 is a diagram for showing a UE according to an embodiment of the present disclosure.

FIG. 10 is a diagram showing a UE according to an embodiment of the present disclosure.

Referring to FIG. 10, a UE 1000 includes a receiver 1010, a controller 1020, and a transmitter 1030.

From a BS, the receiver 1010 may receive BWP configuration information of a BWP set which is composed of one or more BWPs configured for the UE and receive frequency hopping configuration information for a UL control channel and a UL data channel transmitted through one transmission BWP included in the BWP set.

Here, the BWP configuration information is information on the BWP set composed of the one or more BWPs configured for the UE.

For example, the BWP configuration information may include index information which indicates each BWP included in the BWP set composed of the one or more BWPs configured for the UE.

The UE may receive DL control information which indicates one of the BWPs included in the BWP set on the basis of the BWP configuration information from the BS.

Here, the number of bits of information indicating a BWP in the DL control information may be determined according to a maximum number N (N is a natural number greater than or equal to 1) of BWPs which may be used by the UE. For example, when N is set to four, four different pieces of information may be represented by at most two bits. Therefore, in the DL control information, information indicating a BWP may be one bit or two bits.

For another example, the BWP configuration information may additionally include SCS information and a CP for each BWP of the BWP set.

Here, each BWP of the BWP set may be configured on the basis of common RB indexing information of a CC configured by the BS. The CC may be an NB CC or a WB CC, or may refer to one or more CCs for CA.

All UEs which use the same CC may share the same common RB indexing information. In other words, it is possible to apply the same RB indexing regardless of whether an arbitrary CC is based on a single numerology or multiple numerologies are multiplexed on the CC.

Specifically, configuration information of each BWP of the BWP set may include a starting RB index, that is, a starting point of the BWP, based on the common RB indexing information. Such a starting PRB index may be represented in units of RB indices based on common RB indexing. Also, the configuration information of each BWP may additionally include starting RB indexing information based on the common RB indexing information and size information of the corresponding BWP. The BS may transmit the BWP configuration information to the UE through higher layer signaling (e.g., RRC signaling).

Also, the frequency hopping configuration information for a UL control channel may include at least one of information indicating whether to perform frequency hopping, PRB allocation information of a first frequency resource region of the UL control channel, and PRB allocation information of a second frequency resource region of the UL control channel.

The information indicating whether to perform frequency hopping is information which indicates whether to enable or disable frequency hopping for the UL control channel. When the frequency hopping is enabled, the frequency hopping is performed, and when the frequency hopping is disabled, no frequency hopping is performed.

When the frequency hopping is performed, the PRB allocation information of the first frequency resource region of the UL control channel may include starting PRB indexing information of the first frequency resource region.

Likewise, when the frequency hopping is performed, the PRB allocation information of the second frequency resource region of the UL control channel may include starting PRB indexing information of the second frequency resource region.

Also, the frequency hopping configuration information for a UL data channel may include a frequency hopping offset set composed of one or more frequency hopping offset values. Here, the frequency hopping offset values may be indicated as the numbers of PRBs.

The number of frequency hopping offset values included in the frequency hopping offset set may be determined on the basis of the number of PRBs constituting the transmission BWP.

As an example of a method of determining the number of frequency hopping offset values included in the frequency hopping offset set, the number of frequency hopping offset values included in the frequency hopping offset set may be determined depending on whether a number K of PRBs constituting the transmission BWP is a preset threshold value T (T is a natural number greater than or equal to 1) or less.

For example, when K is T (e.g., 50 PRBs) or less, the number of frequency hopping offsets may be set to a preset first hopping offset number (e.g., two), and when K exceeds T, the number of frequency hopping offsets may be set to a preset second hopping offset number (e.g., four). Here, the greater the size of the BWP, the greater the frequency hopping offset may be. Therefore, the second hopping offset number may be set to be greater than the first hopping offset number.

The UE may receive information indicating which one of the frequency hopping offset values included in the frequency hopping offset set will be used from the BS. Here, the BS may notify the UE of the corresponding information through UL grant DCI.

The transmitter 1030 may transmit a UL control channel and a UL data channel to the BS through the transmission BWP on the basis of the BWP configuration information and the frequency hopping configuration information.

The BS may provide the BWP configuration information and the frequency hopping configuration information through higher layer signaling (e.g., RRC signaling).

According to the embodiments of the present disclosure, it is possible to provide a frequency hopping application method for preventing collision between resources used by UEs which use different BWP configurations to transmit UL channels in NR.

The standard content or standard documents mentioned in the above-described embodiments are omitted to simplify the description of this specification, but form a part of this specification. Therefore, adding a part of the standard content and standard documents to this specification or describing a part of the standard content and standard documents in the claims should be construed as being included in the scope of the present disclosure.

The above embodiments of the present disclosure have been described only for illustrative purposes, and those skilled in the art will appreciate that various modifications and changes may be made thereto without departing from the essential features of the disclosure. Therefore, the embodiments of the present disclosure are not intended to limit, but are intended to illustrate the technical idea of the present disclosure, and the scope of the technical idea of the present disclosure is not limited by the embodiments. The scope of the present disclosure shall be construed on the basis of the accompanying claims in such a manner that all of the technical ideas included within the scope equivalent to the claims belong to the present disclosure.

Moreover, the terms "system," "processor," "controller," "component," "module," "interface,", "model," "unit" or the like are generally intended to refer to a computer-related entity, either hardware, a combination of hardware and software, software, or software in execution. For example, a component may be, but is not limited to being, a process running on a processor, a processor, a controller, a control processor, an object, an executable, a thread of execution, a program, and/or a computer. By way of illustration, both an application running on a controller or processor and the controller or processor can be a component. One or more components may reside within a process and/or thread of execution and a component may be localized on one computer and/or distributed between two or more computers.

What is claimed is:

1. A method for a user equipment (UE) to transmit an uplink (UL) control channel and a UL data channel to a base station (BS), the method comprising:
receiving, from a BS, bandwidth part (BWP) configuration information of a BWP set composed of one or more BWPs configured for a UE;
receiving, from the BS, frequency hopping configuration information for a UL control channel and a UL data channel transmitted through one transmission BWP of the BWP set; and
transmitting a UL control channel and a UL data channel to the BS through the transmission BWP based on the BWP configuration information and the frequency hopping configuration information,
wherein the frequency hopping configuration information for a UL data channel includes a frequency hopping offset set composed of one or more frequency hopping offset values, and
wherein a frequency hopping offset value used to transmit the UL data channel among the frequency hopping offset values included in the frequency hopping offset set is indicated by UL grant downlink control information (DCI).

2. The method of claim 1, wherein the frequency hopping configuration information for a UL control channel includes at least one of information indicating whether to perform frequency hopping, physical resource block (PRB) allocation information of a first frequency resource region of the UL control channel, and PRB allocation information of a second frequency resource region of the UL control channel.

3. The method of claim 1, wherein a number of frequency hopping offset values included in the frequency hopping offset set is determined based on a number of physical resource blocks (PRBs) constituting the transmission BWP.

4. The method of claim 3, wherein the number of frequency hopping offset values included in the frequency hopping offset set is determined depending on whether the number of PRBs constituting the transmission BWP is a preset threshold value or less.

5. A method for a base station (BS) to receive an uplink (UL) control channel and a UL data channel from a user equipment (UE), the method comprising:
transmitting bandwidth part (BWP) configuration information of a BWP set composed of one or more BWPs configured for a UE to the UE;
transmitting frequency hopping configuration information for a UL control channel and a UL data channel transmitted through one reception BWP of the BWP set to the UE; and
receiving the UL control channel and the UL data channel from the UE through the reception BWP based on the BWP configuration information and the frequency hopping configuration information,
wherein the frequency hopping configuration information for a UL data channel includes a frequency hopping offset set composed of one or more frequency hopping offset values, and
wherein a frequency hopping offset value used to transmit the UL data channel among the frequency hopping offset values included in the frequency hopping offset set is indicated by UL grant downlink control information (DCI).

6. The method of claim 5, wherein the frequency hopping configuration information for a UL control channel includes at least one of information indicating whether to perform frequency hopping, physical resource block (PRB) allocation information of a first frequency resource region of the UL control channel, and PRB allocation information of a second frequency resource region of the UL control channel.

7. The method of claim 5, wherein a number of frequency hopping offset values included in the frequency hopping offset set is determined based on a number of physical resource blocks (PRBs) constituting the reception BWP.

8. The method of claim 7, wherein the number of frequency hopping offset values included in the frequency hopping offset set is determined depending on whether the number of PRBs constituting the reception BWP is a preset threshold value or less.

9. A user equipment (UE) for transmitting an uplink (UL) control channel and a UL data channel to a base station (BS), the UE comprising:
a receiver configured to receive, from a BS, bandwidth part (BWP) configuration information of a BWP set composed of one or more BWPs configured for the UE and receive, from the BS, frequency hopping configuration information for a UL control channel and a UL data channel transmitted through one transmission BWP of the BWP set; and
a transmitter configured to transmit a UL control channel and a UL data channel to the BS through the transmission BWP based on the BWP configuration information and the frequency hopping configuration information,
wherein the frequency hopping configuration information for a UL data channel includes a frequency hopping offset set composed of one or more frequency hopping offset values, and
wherein a frequency hopping offset value used to transmit the UL data channel among the frequency hopping offset values included in the frequency hopping offset set is indicated by UL grant downlink control information (DCI).

10. The UE of claim 9, wherein the frequency hopping configuration information for a UL control channel includes at least one of information indicating whether to perform frequency hopping, physical resource block (PRB) allocation information of a first frequency resource region of the UL control channel, and PRB allocation information of a second frequency resource region of the UL control channel.

11. The UE of claim 9, wherein a number of frequency hopping offset values included in the frequency hopping offset set is determined based on a number of physical resource blocks (PRBs) constituting the transmission BWP.

12. The UE of claim 11, wherein the number of frequency hopping offset values included in the frequency hopping offset set is determined depending on whether the number of PRBs constituting the transmission BWP is a preset threshold value or less.

* * * * *